(12) United States Patent
Feliberti et al.

(10) Patent No.: US 10,726,395 B2
(45) Date of Patent: *Jul. 28, 2020

(54) CALENDAR REPAIR ASSISTANT

(71) Applicant: Microsoft Technology Licensing, LLC, Redmond, WA (US)

(72) Inventors: Vanessa C. Feliberti, Sammamish, WA (US); Cliff M. Don, Redmond, WA (US); Firdosh R. Ghyara, Redmond, WA (US); Sina Hakami, Kirkland, WA (US); Matthias Leibmann, Woodinville, WA (US); Roberto Ribeiro Da Fonseca Mendes, Seattle, WA (US); Paul David Tischhauser, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/239,038

(22) Filed: Jan. 3, 2019

(65) Prior Publication Data
US 2019/0139003 A1 May 9, 2019

Related U.S. Application Data

(63) Continuation of application No. 14/948,973, filed on Nov. 23, 2015, now Pat. No. 10,176,462, which is a continuation of application No. 13/765,644, filed on Feb. 12, 2013, now Pat. No. 9,213,964, which is a continuation of application No. 12/647,934, filed on Dec. 28, 2009, now Pat. No. 8,375,081.

(51) Int. Cl.
*G06F 15/16* (2006.01)
*G06Q 10/10* (2012.01)
(Continued)

(52) U.S. Cl.
CPC ....... *G06Q 10/1095* (2013.01); *G06Q 10/109* (2013.01); *G06F 16/20* (2019.01);
(Continued)

(58) Field of Classification Search
CPC .. G06Q 10/1095; G06Q 10/109; G06Q 10/10; G06Q 10/1093; G06F 16/17;
(Continued)

(56) References Cited

U.S. PATENT DOCUMENTS 5,093,901 A * 3/1992 Cree ............... G06Q 10/109
715/753
5,774,867 A * 6/1998 Fitzpatrick ........... G06Q 10/109
705/7.19
(Continued)

OTHER PUBLICATIONS

Workspace, Johnny Yao., "Address List & Calendar Repair", Retrieved from: http://johnnyyao.blogspot.com/2009_11_08_archive.html, Nov. 13, 2009, 18 Pages.

*Primary Examiner* — Alan S Chou
(74) *Attorney, Agent, or Firm* — Alleman Hall Creaseman & Tuttle LLP

(57) ABSTRACT

Calendar repair may be provided. Calendar events, such as appointments and meetings, may be created and copied to a plurality of attendee calendars. A first copy of the event may be compared to a second copy of the event, and an event property of the second event may be updated to match a corresponding event property of the first event.

20 Claims, 5 Drawing Sheets

(51) Int. Cl.
*G06F 16/20* (2019.01)
*G06F 16/23* (2019.01)
*G06F 16/27* (2019.01)

(52) U.S. Cl.
CPC ............ *G06F 16/23* (2019.01); *G06F 16/235* (2019.01); *G06F 16/2358* (2019.01); *G06F 16/2379* (2019.01); *G06F 16/27* (2019.01); *G06F 16/275* (2019.01); *G06Q 10/10* (2013.01); *G06Q 10/1093* (2013.01)

(58) Field of Classification Search
CPC .... G06F 16/2379; G06F 16/23; G06F 16/275; G06F 16/235; G06F 16/20; G06F 16/2358
USPC ......................................................... 709/203
See application file for complete search history.

(56) References Cited

U.S. PATENT DOCUMENTS

| | | | | |
|---|---|---|---|---|
| 5,960,406 | A * | 9/1999 | Rasansky | G06Q 10/1093 705/7.18 |
| 6,064,977 | A * | 5/2000 | Haverstock | G06Q 10/109 705/7.18 |
| 7,877,356 | B1 | 1/2011 | Guiheneuf et al. | |
| 8,375,081 | B2 * | 2/2013 | Feliberti | G06Q 10/109 709/203 |
| 9,213,964 | B2 * | 12/2015 | Feliberti | G06Q 10/109 |
| 10,176,462 | B2 * | 1/2019 | Feliberti | G06Q 10/109 |
| 2007/0130223 | A1 | 6/2007 | Savilampi et al. | |

* cited by examiner

*300*

|       | Monday | Tuesday | Wednesday | Thursday | Friday |
|-------|--------|---------|-----------|----------|--------|
| 8:00  |        |         |           |          |        |
| 9:00  |        |         |           |          |        |
| 10:00 |        | Meeting |           |          |        |
| 11:00 |        | 310     |           |          |        |
| 12:00 |        |         | Lunch     | AAA      |        |
| 1:00  |        |         | 320       | 330      |        |
| 2:00  |        |         |           |          |        |
| 3:00  |        |         |           |          |        |
| 4:00  |        |         |           |          |        |
| 5:00  |        |         |           |          |        |
| 6:00  |        |         |           |          |        |

|       | Monday | Tuesday | Wednesday | Thursday | Friday |
|-------|--------|---------|-----------|----------|--------|
| 8:00  |        |         |           |          |        |
| 9:00  |        |         |           |          |        |
| 10:00 |        |         |           |          |        |
| 11:00 |        |         |           |          |        |
| 12:00 |        | Meeting |           | XYZ      |        |
| 1:00  |        | 360     |           | 370      |        |
| 2:00  |        |         |           |          |        |
| 3:00  |        |         |           |          |        |
| 4:00  |        |         |           |          |        |
| 5:00  |        |         |           |          |        |
| 6:00  |        |         |           |          |        |

410 — Title: Meeting
420 — Re: Project Status

430 — Organizer: John Smith
440 — Attendees: Jane Doe, Bill Jones, John Doe

450 — Start Time: 9:30 AM
460 — Duration: 1.5 Hours

470 — Reminder: 15 Minutes

480 — Location: Conference Room 1

490 — Notes: Jane's deadline changed. Bill's last report needs revision.

*FIG. 4*

CALENDAR REPAIR ASSISTANT

RELATED APPLICATIONS

This application is a continuation of U.S. patent application Ser. No. 14/948,973, entitled "Calendar Repair Assistant," filed on Nov. 23, 2015 (now U.S. Pat. No. 10,176, 462), which application is a continuation of U.S. patent application Ser. No. 13/765,644 (now U.S. Pat. No. 9,213, 964), filed Feb. 12, 2013, which application is a continuation of U.S. patent application Ser. No. 12/647,934 (now U.S. Pat. No. 8,375,081), filed Dec. 28, 2009, each of which is hereby incorporated herein by reference in its entirety.

Related U.S. patent application Ser. No. 12/647,944 (now U.S. Pat. No. 8,612,535), filed Dec. 28, 2009, entitled "Repairing Calendars with Standard Meeting Messages," which is assigned to the assignee of the present application, and hereby incorporated herein by reference.

Related U.S. patent application Ser. No. 12/647,962 (now U.S. Pat. No. 8,392,365), filed Dec. 28, 2009, entitled "Identifying Corrupted Data on Calendars with Client Intent," which is assigned to the assignee of the present application, and hereby incorporated herein by reference.

BACKGROUND

Calendar repair is a process for verifying the accuracy of important meeting properties. In some situations, calendars contain appointments (meetings) that may be organized by one person, the Organizer. The same meeting may be represented as multiple independent items stored in many different calendars of all attendees of the meeting. The Organizer, attendees, and calendar applications may change these independent items during the lifetime of the meeting, making them inconsistent between what the Organizer has on the calendar and what attendees may have on their calendar. This often causes problems because, if the meeting gets out-of sync between the organizer and attendees, it may cause attendees to miss the meeting. The conventional strategy is to rely on attendee users to keep their own meeting appointments in-sync and up to date, but these users may not always be able to identify discrepancies.

SUMMARY

Calendar repair may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Calendar repair may be provided. Calendar events, such as appointments and meetings, may be created and copied to a plurality of attendee calendars. A first copy of the event may be compared to a second copy of the event, and an event property of the second event may be updated to match a corresponding event property of the first event.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings:

FIGS. 3A-3B are block diagrams of user calendars;

FIG. 4 is a block diagram of an example event; and

DETAILED DESCRIPTION

Figure 1:
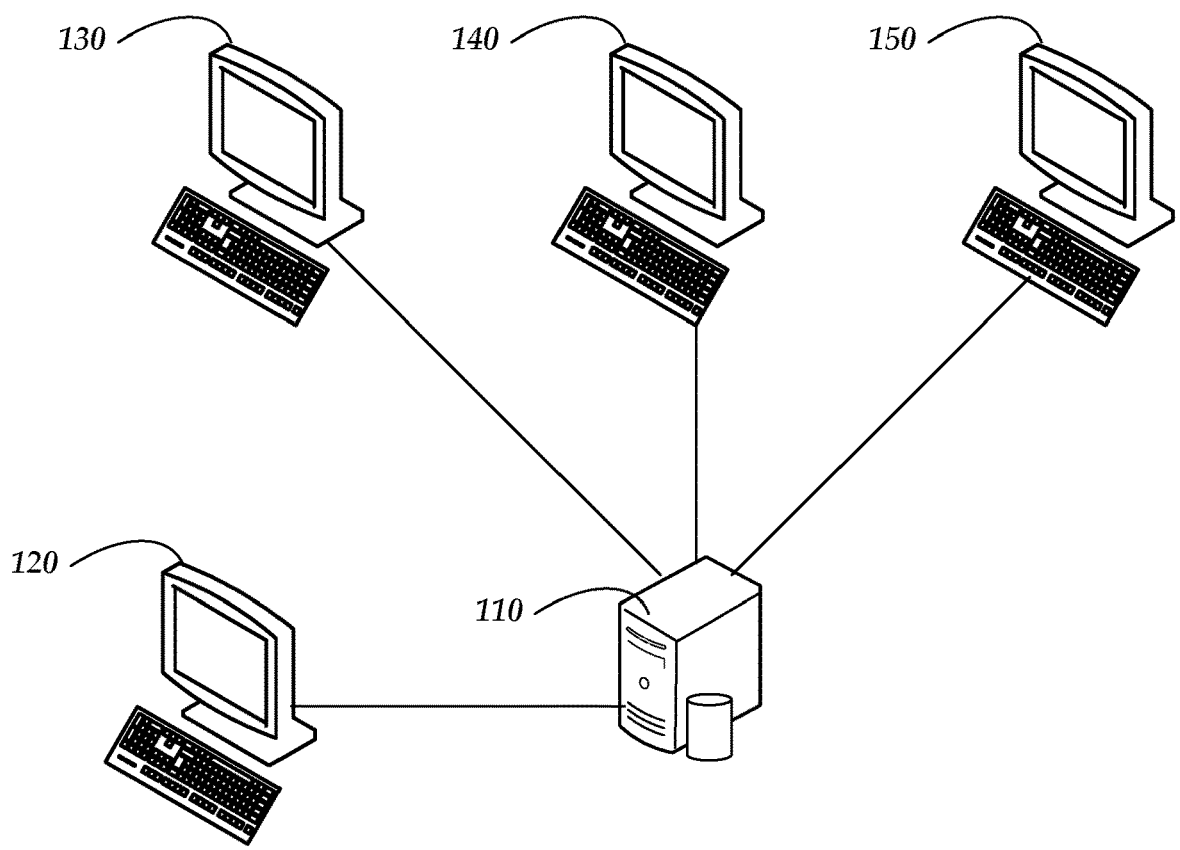
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Calendar repair may be provided. Consistent with embodiments of the present invention, corresponding calendar items of organizers and attendees may be compared on a regular basis. A calendar server, such as Microsoft® Exchange®, produced and sold by Microsoft® Corporation of Redmond, Wash., may verify that important properties such as time, date, and/or attendee response status match as inconsistencies in such properties may result in an attendee missing the meeting. The verification may be done by applying additional business logic to allow certain flexibility in discrepancies and allow attendees to still have enough flexibility to edit their meeting item. If the discrepancy violates the business logic (e.g., the inconsistency of the properties will lead to a missed meeting), the server may perform the appropriated corrective actions, such as changing properties on an attendee's appointment to match the organizer's version of the appointment.

FIG. 1 is a block diagram of an operating environment 100 comprising a server 110, an organizer computer 120, and a plurality of attendee computers 130, 140, and 150. A user of organizer computer 120 may prepare a meeting request that may be relayed to users of the plurality of attendee computers 130, 140, and 150. The meeting request may comprise a plurality of properties, such as those described in greater detail below with respect to FIG. 4. Each attendee user may accept or reject the meeting request and/or propose changes to at least one of the meeting properties, such as proposing a different time or location. The organizer user may view each attendee's response in a calendar application on organizer computer 120 and review, accept, and/or reject any proposed changes by the attendees in the calendar application. Details regarding the event may be stored on server 110 and/or replicated to organizer computer 120 and/or any and/or all of plurality of attendee computers 130, 140, and 150.

Figure 2:
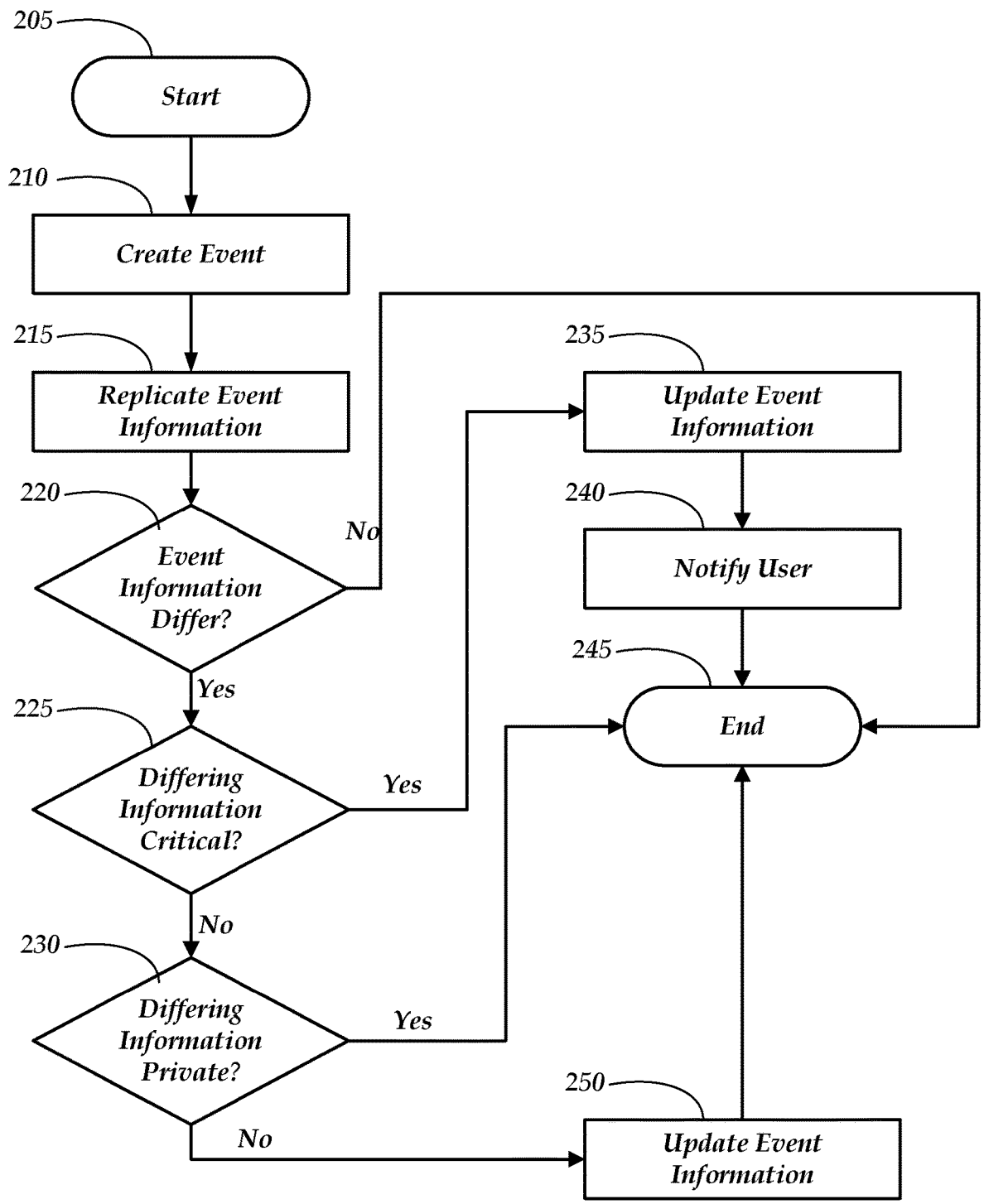
FIG. 2 is a flow chart of a method for providing calendar repair.

FIG. 2 is a flow chart setting forth the general stages involved in a method 200 consistent with an embodiment of the invention for providing calendar repair. Method 200 may be implemented using a computing device 500 as described in more detail below with respect to FIG. 5. Ways to implement the stages of method 200 will be described in greater detail below. Method 200 may begin at starting block 205 and proceed to stage 210 where computing device 500 may create an event. For example, a user of organizer computer 120 may create a meeting event and set event properties such as a start time, duration, location, and subject. The user may also send meeting invitations to a plurality of attendee users and receive responses from those attendees.

After creating the event in stage 210, method 200 may advance to stage 215 where computing device 500 may replicate the event properties to other calendars. For example, the event associated with the user of organizer computer 120 may be copied to a shared calendar on server 110 and/or a calendar application executing on at least one of plurality of attendee computers 130, 140, and 150.

From stage 215, method 200 may advance to stage 220 where computing device 500 may determine whether a property associated with a first copy of the event differs from a corresponding property associated with a second copy of the event. For example, the organizer's copy of the event may be compared to one and/or more of the attendees' copies of the event to determine whether any of the properties differ. Consistent with embodiments of the invention, this comparison may be performed on a periodic basis, such as once every 24 hours and/or during a low server load time. For example, server 110 (and/or an administrator thereof) may select a time when few other server processes are executing to perform event comparisons. The comparison may also be performed manually, such as by an administrator executing an application associated with performing method 200 on server 110.

If no differences are found at stage 220, method 200 may end at stage 245. Otherwise, method 200 may advance to stage 225 where computing device 500 may determine whether the differing information is critical. Critical information may comprise, for example, those event properties that may cause the user associated with the out-of-sync information to miss some and/or all of the meeting and/or to attempt to attend a meeting that has been canceled or rescheduled. For example, server 110 may compare the organizer's copy of the event to an event associated with a user of attendee computer 130 and determine that the organizer's copy has a start time of 9:00 while the attendee's copy has a start time of 9:30. Since the attendee would not have the correct start time, they may miss the meeting, and this difference may be considered critical.

Other critical properties may comprise, for example, an event's existence, an event's location, an event request acceptance, a duplicate property, a duplicate event, and a corruption. For example, the event may be missing entirely from the attendee's calendar and/or may have been corrupted and become unreadable by attendee computer 130, 140, or 150. Similarly, duplicate properties and/or an out-of-sync acceptance of the meeting request (e.g., the attendee accepted the meeting request, but that acceptance may not have been relayed to the organizer) may cause a calendar application and/or other applications, such as a server-based reminder service, that interact with the attendee user's calendar to miss and/or mistime a reminder.

If, at stage 225, computing device 500 determines that the differing event property is critical, method 200 may advance to stage 235 where computing device 500 may update the event property. For example, server 110 may copy the starting time from the organizer's copy of the event to the attendee's copy of the event. The organizer's copy of the event may be considered to be the master copy of the event properties, and may override the properties of the attendees' events. For another example, server 110 may determine that an event is still present on an attendee's calendar, but has been removed from an organizer's calendar. Server 110 may delete the item from the attendee's calendar, and place a copy of the event in a deleted items log and/or folder for review and/or recovery by the attendee.

Consistent with embodiments of the invention, other methods may be used to resolve differences, such as keeping a master copy of the event on the server, separate from the calendars of the attendees and/or organizer, or using a most recently updated event property as the correct value. Computing device 500 may also compare the copies of the event for the organizer and all of the attendees to determine whether a majority or plurality of the events agree on the out-of-sync property, and use the agreed on value to update the out-of-sync property.

After computing device 500 updates the event information in stage 235, method 200 may proceed to stage 240 where computing device 500 may notify the user of the update. For example, server 110, organizer computer 120, and/or attendee computers 130, 140, and 150 may display a visual notification on a screen, provide an audio alert, and/or send an e-mail or Short Message Service (SMS) message. Once computing device 500 notifies the user in stage 235, method 200 may then end at stage 245.

If, at stage 225, computing device 500 determines that the differing information is not critical, method 200 may advance to stage 230 where computing device 500 may determine whether the differing information is private. For example, the organizer and/or an attendee may add additional information to their copy of the event, such as a note to remind them to raise a particular issue during a meeting. These notes may differ and/or be absent among some or all of the other event copies, and method 200 may advance to stage 250 where computing device may copy the updated information to the other event copies. After updating the event property, or if the property is marked as private, such as by using a designated private property field and/or setting a private flag for the property, method 200 may end at stage 245.

FIG. 3A comprises a block diagram of a first calendar 300 comprising a first meeting 310, a lunch event 320, and a second meeting 330. Meeting 310 and lunch meeting 320 may comprise events for which a user associated with first calendar 300 is an organizer, while second meeting 330 may comprise an event for which the user associated with first calendar 300 is an attendee.

FIG. 3B comprises a block diagram of a second calendar 350 comprising a copy of the first meeting 360 and a copy of the second meeting 370. Copy of first meeting 360 may comprise an event for which a user associated with second calendar 350 is an attendee, while copy of the second meeting 370 may comprise an event for which the user associated with second calendar 350 is an organizer.

Consistent with embodiments of the invention, method 200 may be invoked by server 110 to compare the events of first calendar 300 with the events of second calendar 350. For example, first meeting 310 may comprise a start time property of 9:30 AM while copy of the first meeting 360 may comprise a corresponding start time property of 11:30 AM. Since first meeting 310 is associated with the organizer of the event, and the start time property may be considered to be critical to attendance, the start time of 9:30 AM may be used to update copy of the first meeting 360 on second calendar 350. For a second example, method 200 may determine that the user of second calendar 350 accepted a meeting request for lunch meeting 320 and may further determine that the event is missing from second calendar 250. Server 110 may therefore create an event on second calendar 350 corresponding to lunch meeting 320. For another example, server 110 may compare copy of the second meeting 370 with second meeting 330 and determine that the only difference is in the meeting title. This difference may be determined to not be critical, and so the corresponding title properties may be left out-of-sync between the two events. Consistent with embodiments of the invention, the occurrence of the comparison and determination may be recorded in a log associated with the event. Server 110 may refer to the log on a later comparison of the two events, and may consequently skip over the non-critical information rather than re-compare the properties known to be out-of-sync. An administrator of server 110 may configure a list of event properties considered to be critical, and may update this list at any time. If the list has changed, server 110 may be operative to determine whether any previously determined out-of-sync properties are now considered to be critical, and may update those properties in accordance with method 200.

FIG. 4 is a block diagram of an example event 400 comprising a plurality of properties. Example event 400 may comprise a title 410, a subject 420, an organizer 430, an attendee list 440, a start time 450, a duration 460, a reminder alarm 470, a location 480, and a notes field 490. Start time 450, duration 460, and location 480, for example, may be considered critical properties to ensure an attendee does not miss the relevant event. Notes field 490, for example, may be designated as a private property by default.

Method 200 may produce an output file comprising information indicating what updates, if any, may have been made along with identifying information for the event being updated. An output file may be produced for each user and/or each event, such as a file per user, per event, per periodic update. Consistent with embodiments of the invention, a single output file may be used for all logged updates. Each logged update may comprise a plurality of properties, such as a category, an organizer, an attendee (and/or attendees), an indication if the item was repaired due to an issue with the organizer's item or the attendee's item, a start and end time of the meeting, a subject of the meeting, a meeting type (single event, occurrence master, or occurrence instance), and/or a repair action.

If an event includes a group and/or a distribution list (e.g., a single attendee entry associated with a plurality of users), server 110 may be operative to expand the distribution list and compare the organizer's event to a copy of the event on each of the plurality of users' calendars. Consistent with embodiments of the invention, expansion of the group may be limited to a maximum number of users to avoid negatively impacting server performance. This group expansion may be configured by an administrator of server 110.

An embodiment consistent with the invention may comprise a system for providing calendar repair. The system may comprise a memory storage and a processing unit coupled to the memory storage. The processing unit may be operative to create an event associated with a plurality of attendees, copy the event to a plurality of calendars, compare a first copy of the event to a second copy of the event, and update an event property of the second event to match a corresponding event property of the first event. The comparison may be performed on a periodic basis, such as every 24 hours, and/or may occur during a time of low server load.

Another embodiment consistent with the invention may comprise a system for providing calendar repair. The system may comprise a memory storage and a processing unit coupled to the memory storage. The processing unit may be operative to create an event associated with at least one organizer and a plurality of attendees, copy at least one property associated with the event to a plurality of calendars, and determine whether the at least one property associated with the event on at least one of the plurality of calendars is the same as a corresponding property associated with the event associated with the organizer. If the properties are out-of-sync, the processing device may be further operative to update the at least one property to match the corresponding property associated with the organizer's event.

Yet another embodiment consistent with the invention may comprise a system for providing calendar repair. The system may comprise a memory storage and a processing unit coupled to the memory storage. The processing unit may be operative to create an event on a calendar associated with an organizer of the event, replicate information associated with the event to a plurality of attendee calendars, determine, on a periodic basis, whether the information associated with the event on at least one of the attendees' calendars differs from the information associated the organizer's event, determine whether any such difference comprises a property likely to cause the attendee to miss the meeting. The processing unit may be further operative to update the event on the attendee's calendar with the information from the organizer's event and provide a notification to the attendee that the event has been updated. Such notification may comprise, for example, at least one of the following: sending an e-mail message to the user, sending an SMS message to the user, and displaying a notification message on a display device associated with the user. The processing unit may be further operative to determine whether the differing information associated either the attendee's event or the organizer's event comprises a private property, and, if so, leave the information out-of-sync between the attendee event and the organizer's event.

Figure 5:
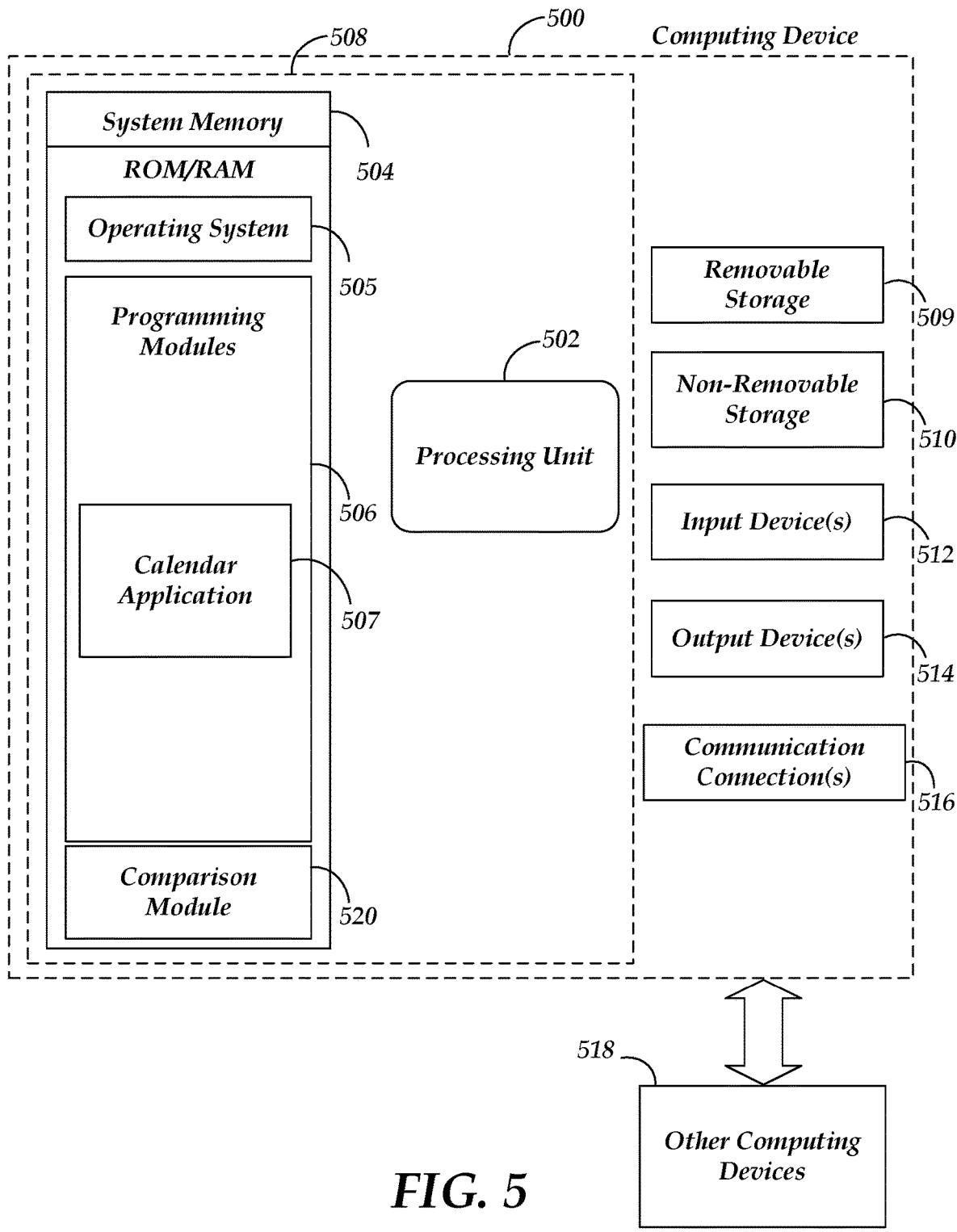
FIG. 5 is a block diagram of a system including a computing device.

FIG. 5 is a block diagram of a system including computing device 500. Consistent with an embodiment of the invention, the aforementioned memory storage and processing unit may be implemented in a computing device, such as computing device 500 of FIG. 5. Any suitable combination of hardware, software, or firmware may be used to implement the memory storage and processing unit. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the invention. Furthermore, computing device 500 may comprise an operating environment for system 100 as described above. System 100 may operate in other environments and is not limited to computing device 500.

With reference to FIG. 5, a system consistent with an embodiment of the invention may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include a calendar application 507. Operating system 505, for example, may be suitable for controlling computing device 500's operation. In one embodiment, programming modules 506 may include an event comparison module 520. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g. event comparison module 520) may perform processes including, for example, one or more of method 200's stages as described above. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing electronic calendar repair, the method comprising:
   receiving a calendar event from an organizer computer that is associated with an organizer, the calendar event stored on a first calendar associated with the organizer and including a plurality of event properties comprising details about the calendar event;
   copying the calendar event to a second calendar associated with an attendee;
   after a period of time, performing a comparison of the calendar event on the first calendar with the calendar event on the second calendar to identify one or more different event properties;
   determining that a first different event property is critical and a second different event property is non-critical, wherein the first different event property is one of: a start time, a date, or a location; and
   updating the first different event property in the second calendar with a corresponding event property from the first calendar, wherein the second different event property in the second calendar remains out-of-sync from the first calendar.

2. The method of claim 1, further comprising:
   storing a master copy of the calendar event on a server separate from the first calendar and the second calendar.

3. The method of claim 2, wherein updating the first different event property in the second calendar includes using the master copy of the calendar event.

4. The method of claim 1, wherein the calendar event includes additional information that one of the organizer or an attendee designated as private, and wherein the additional information is only viewable by the organizer or the attendee that designated the additional information as private.

5. The method of claim 4, wherein performing the comparison of the calendar event on the first calendar with the calendar event on the second calendar to identify one or more different event properties excludes the additional information that the organizer or the attendee designated as private.

6. The method of claim 1, wherein the first different event property is an event property that is absent from the second calendar.

7. The method of claim 1, wherein the method is performed by a server.

8. A system for providing electronic calendar repair, the system comprising:
   a memory storing computer-executable instructions; and
   a processing unit coupled to the memory, wherein upon executing the instructions the processing unit is operative to:
      receive a calendar event from an organizer computer that is associated with an organizer, the calendar event stored on a first calendar associated with the organizer and including a plurality of event properties comprising details about the calendar event;
      copy the calendar event to a second calendar associated with an attendee;
      after a period of time, compare the calendar event on the first calendar with the calendar event on the second calendar to identify one or more different event properties;
      determine that a first different event property is critical and a second different event property is non-critical, wherein the first different event property is one of: a start time, a date, or a location; and
      update the first different event property in the second calendar with a corresponding event property from the first calendar, wherein the second different event property in the second calendar remains out-of-sync from the first calendar.

9. The system of claim 8, the instructions further causing the processing unit to:
   store a master copy of the calendar event on a server separate from the first calendar and the second calendar.

10. The system of claim 9, wherein updating the first different event property in the second calendar includes using the master copy of the calendar event.

11. The system of claim 8, wherein the calendar event includes additional information that one of the organizer or an attendee designated as private, and wherein the additional information is only viewable by the organizer or the attendee that designated the additional information as private.

12. The system of claim 11, wherein performing the comparison of the calendar event on the first calendar with the calendar event on the second calendar to identify one or more different event properties excludes the additional information that the organizer or the attendee designated as private.

13. The system of claim 8, wherein the first different event property is an event property that is absent from the second calendar.

14. The system of claim 8, wherein the first different event property is an event property that is corrupted in the second calendar.

15. A computer-readable storage device storing a set of instructions that when executed by a processing unit cause the processing unit to perform a method, comprising:
- receiving a calendar event from an organizer computer that is associated with an organizer, the calendar event stored on a first calendar associated with the organizer and including a plurality of event properties comprising details about the calendar event;
- copying the calendar event to a second calendar associated with an attendee;
- after a period of time, performing a comparison of the calendar event on the first calendar with the calendar event on the second calendar to identify one or more different event properties;
- determining that a first different event property is critical and a second different event property is non-critical, wherein the first different event property is one of: a start time, a date, or a location; and
- updating the first different event property in the second calendar with a corresponding event property from the first calendar, wherein the second different event property in the second calendar remains out-of-sync from the first calendar.

16. The computer-readable storage device of claim 15, the set of instructions when executed causing the processing unit to perform the method, further comprising:
- storing a master copy of the calendar event on a server separate from the first calendar and the second calendar.

17. The computer-readable storage device of claim 16, wherein updating the first different event property in the second calendar includes using the master copy of the calendar event.

18. The computer-readable storage device of claim 15, wherein the calendar event includes additional information that one of the organizer or an attendee designated as private, and wherein the additional information is only viewable by the organizer or the attendee that designated the additional information as private.

19. The computer-readable storage device of claim 18, wherein performing the comparison of the calendar event on the first calendar with the calendar event on the second calendar to identify one or more different event properties excludes the additional information that the organizer or the attendee designated as private.

20. The computer-readable storage device of claim 15, wherein the first different event property is an event property that is absent from the second calendar.

* * * * *